(12) United States Patent
Buczko

(10) Patent No.: US 7,500,776 B1
(45) Date of Patent: Mar. 10, 2009

(54) METHOD FOR ILLUMINATING OBJECTS AND FIXTURES IN AQUARIUMS

(76) Inventor: Andrew S. Buczko, 700 Hancock Ave., Apt. B3, Akron, OH (US) 44314

(*) Notice: Subject to any disclaimer, the term of this patent is extended or adjusted under 35 U.S.C. 154(b) by 201 days.

(21) Appl. No.: 11/410,348

(22) Filed: Apr. 25, 2006

Related U.S. Application Data

(60) Provisional application No. 60/674,538, filed on Apr. 25, 2005.

(51) Int. Cl.
*A01K 63/06* (2006.01)
*F21V 33/00* (2006.01)

(52) U.S. Cl. .................. 362/562; 362/101; 119/267

(58) Field of Classification Search .......... 362/562, 362/101, 551–582, 96, 154, 318; 385/115, 385/901; 119/253, 255–258, 266, 267
See application file for complete search history.

(56) References Cited

U.S. PATENT DOCUMENTS

| | | | | |
|---|---|---|---|---|
| 3,609,343 | A | * | 9/1971 | Howlett ................ 362/562 |
| 3,749,901 | A | * | 7/1973 | Clough ................ 362/562 |
| 5,067,059 | A | | 11/1991 | Hwang |
| 5,211,469 | A | | 5/1993 | Matthias et al. |
| 5,558,421 | A | | 9/1996 | Guastella |
| 5,597,228 | A | | 1/1997 | Boyle |
| 6,074,071 | A | | 6/2000 | Baumberg et al. |
| 6,086,215 | A | | 7/2000 | Giattino et al. |
| 6,132,056 | A | | 10/2000 | Ruthenberg |
| 6,386,746 | B1 | | 5/2002 | Kao |

* cited by examiner

*Primary Examiner*—Bao Q Truong
(74) *Attorney, Agent, or Firm*—Robert C. Montgomery

(57) ABSTRACT

A fiber optic illumination system and method is utilized to provide illumination for decorative fixtures and objects situated in an aquarium, terrarium, and the like. An external, high-intensity lamp, powered by household electricity, provides the light source for a flexible, fiber optic bundle that is insulated and waterproofed. A motorized, interchangeable color wheel, located between the lamp and the fiber optic bundle, modifies the light source to create colored light. Once the light bundle is inserted into the water tank, the fiber optic strands are separated and directed to a plurality of interchangeable, transparent and translucent fixtures and objects to decorate the aquarium.

13 Claims, 4 Drawing Sheets

METHOD FOR ILLUMINATING OBJECTS AND FIXTURES IN AQUARIUMS

RELATED APPLICATIONS

The present invention was first described in Disclosure Document Registration No. 546,247 filed on Feb. 17, 2004 and, subsequently, in U.S. Provisional Patent Application No. 60/674,538 filed on Apr. 25, 2005. Presently, there are no other co-pending, non-provisional applications anywhere in the world.

FIELD OF THE INVENTION

The present invention relates generally to a method for illuminating decorative fixtures and objects and, more particularly, to a method for illumination provided by a fiber optic bundle having an external light source, a motorized color wheel and an external electrical power supply that is attached with various strands from the bundle to underwater aquarium fixtures.

BACKGROUND OF THE INVENTION

Keeping fish in a tank or aquarium is a hobby enjoyed by many people. Such aquariums serve many purposes. Not only do they form a centerpiece for room decor, but they are a calming and soothing visual device as well. As with many hobbies, tank owners are constantly looking for new and exciting developments associated with the hobby that they can utilize to customize and decorate their tank. In the past, such developments have centered on accessories and plants placed in the water. With the advancement of fiber optic technology, more interesting possibilities exist, including illumination for aquarium fixtures and objects.

Several attempts have been made in the past to provide ornamental light inside an aquarium. U.S. Pat. No. 5,067,059 issued in the name of Hwang provides for a fiber optic, variable light source using an ornamental color wheel to decorate fixtures inside an aquarium. This patent places the lamp source on the exterior of the aquarium with the optical fiber units inside. The light would be projected through the glass wall of the tank to match the fiber bundle and color wheel located in the tank and underwater. The lighted fiber optic strands would then proceed to the decorative fixture.

U.S. Pat. No. 6,386,746 issued in the name of Kao provides an artificial tree, or similar foliage, having at least one bundle of optical fibers. This patent has a light source at the proximal end, directed toward the distal end where the fibers are sharply bent, to create a unique effect.

U.S. Pat. No. 6,086,215 issued in the name of Giattino et al. describes a laser light device having an external power supply that is waterproof, allowing it to be placed within the aquarium and to project a laser light beam through the water. The laser can be mounted within a fixture, and projected from the fixture, for reflections throughout the tank while interacting with the fish.

U.S. Pat. No. 6,074,071 issued in the name of Baumberg et al. discloses an aquarium lighting system for illuminating the interior of an aquarium. The primary focus of this patent is to create underwater patterns by using lengths of flexible electroluminescent filaments with power provided by an external to the aquarium, conventional electrical supply.

U.S. Pat. No. 5,211,469 issued in the name of Mathias et al. describes an aquarium lighting system for in-tank, underwater illumination. The method of illumination is that of an insulated low-voltage wire, energizing a waterproof, light-emitting diode (LED) lens. The LED is then attachable to a fixture or object by means of a tie wrap or suction cup.

U.S. Pat. No. 5,558,421 issued in the name of Guastella describes a decorative fiber optic lamp. A motor and a color wheel located above the light source allow for a cycle of blended color changes. This patent is representative of other fiber optic light fixtures that wholly reside outside an aquarium or other water tanks.

U.S. Pat. No. 5,597,228 issued in the name of Boyle discloses an illuminated aquarium landscaping system having a plurality of terrain levels and underwater objects. The base of the water tank is transparent. Attached to the transparent tank base is a light compartment. Within the light compartment resides a switched light source that projects lamp light up through the tank's transparent base, to illuminate decorative objects and fixtures that are underwater.

U.S. Pat. No. 6,132,056 issued in the name of Ruthenberg discloses an apparatus for producing a fiber optic illuminated waterfall. This patent includes eight separate embodiments to accomplish decorative lighting effects for cascading water.

None of the prior art particularly describes the method of ornamental lighting of underwater fixtures and objects within an aquarium or similar tank by means of a fiber optic strand bundle comprised of an external light source, motorized color wheel and an external power supply that can be placed within the water tank at any time.

SUMMARY OF THE INVENTION

In view of the foregoing disadvantages inherent in the prior art, it has been observed that there is a need for a system that allows for inserting illuminated fixtures and objects into an aquarium or similar tank in order to produce decorative lighting effects.

It has further been observed that there is a need for a means to insert the illuminated fixtures and objects into the aquarium or similar tank when the tank is already filled with water.

The object of the invention is to provide a method of producing ornamental water fixtures and objects that are illuminated by fiber optics.

It is a further object of the invention to ensure that the method of providing electricity to the fiber optic light source is safe.

It is a further object of the invention to provide a motorized, rotating color wheel that alters the color of the light source projected through the fiber optic bundle.

It is a further object of the invention that the color wheel be interchangeable, allowing multiple variations of colors that could be projected into the fiber optic bundle, and ultimately to the underwater fixtures and objects, for enhanced decorative displays.

It is a further object of the invention to provide for the secure connectivity of the fiber optic illumination into the aquarium or similar tank to ensure reliability.

It is a further object of the invention to provide for the capability to remove fiber optic illuminated fixtures or objects without hazard or needing to empty the water tank.

It is a further object of the invention to provide for the simple interchangeability of fixtures and objects within the aquarium or similar tank to the fiber optic bundle.

To achieve the above and other objectives, the present invention advances the art by providing a new and novel system and method of illuminating fixtures and objects that can placed, or interchanged with other fixtures and objects, within an aquarium or similar tank at any time in a safe and efficient manner using a fiber optic strand bundle having an external light source, a motorized color wheel that is capable of a plurality of other optional interchangeable color wheels, and a switched alternating current (AC) electrical power supply. The herein disclosed method will result in providing interesting illuminated color decorations for inside of an aquarium or similar tank that can be simply modified.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | fiber optic lighting source unit |
| 20 | power supply cord |
| 30 | power supply (with GFI) |
| 40 | motor and lighting mount |
| 50 | wire for lighting unit |
| 60 | wire for motor |
| 70 | lamp socket |
| 80 | lamp |
| 90 | lamp shroud |
| 100 | motor |
| 110 | wheel driver |
| 115 | angle of rotation |
| 120 | rotary wheels |
| 125 | color filter |
| 130 | optical fiber bundle |
| 135 | colored light |
| 140 | optical fiber sheath |
| 145 | optical fiber sheath terminus |
| 150 | optical fiber "T" connector |
| 155 | retaining clip |
| 160 | optical fiber decorative insert |
| 165 | stop |
| 170 | decorative insert optical fiber bundle |
| 190 | aquarium |

DETAILED DESCRIPTION OF THE PREFERRED EMBODIMENT

Figure 1:
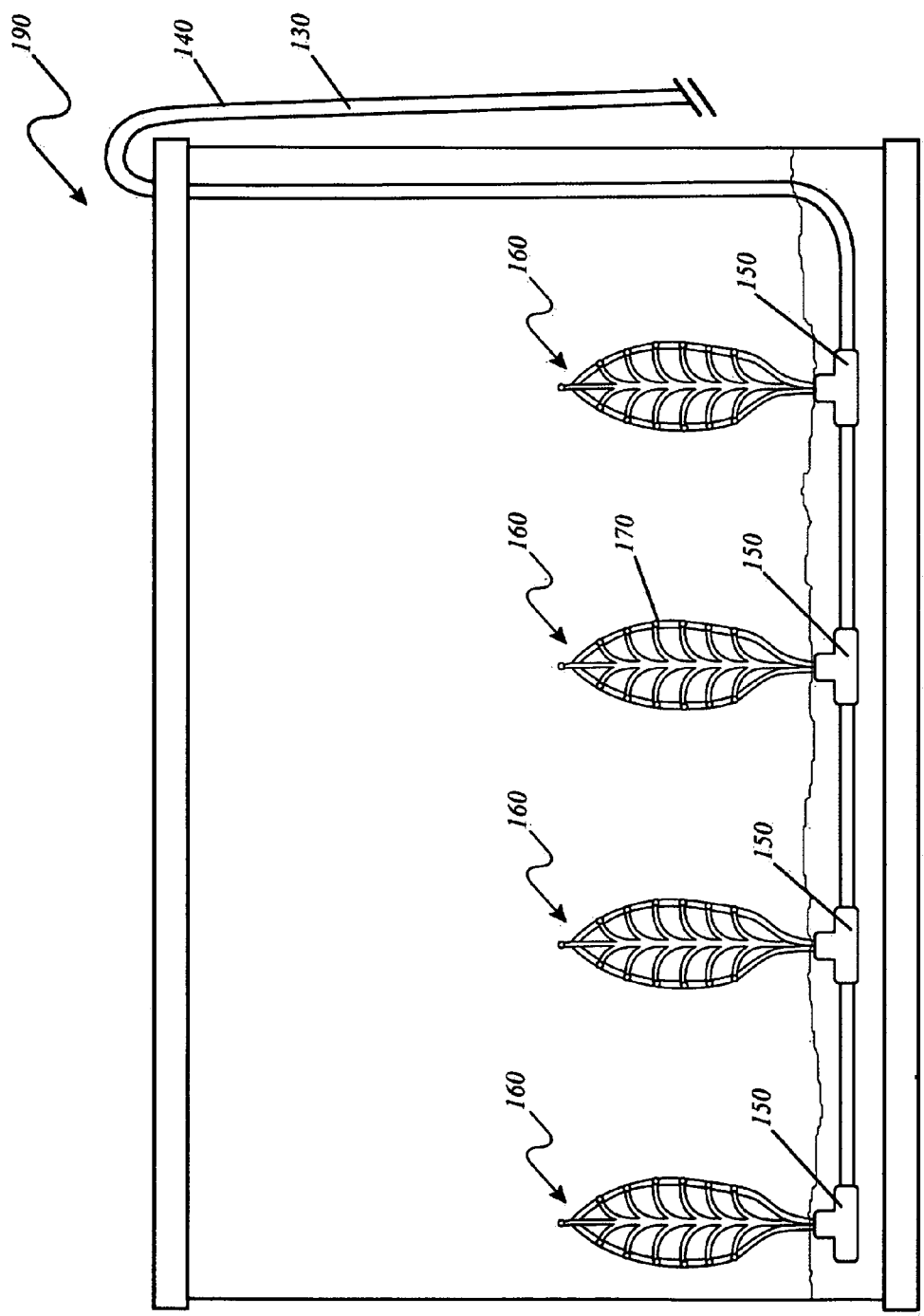
FIG. 1 illustrates the optical fiber decorative inserts 160 in operation inside an aquarium 190, according to a preferred embodiment of the present invention; and, FIG. 2 is a cut-away view of a fiber optic lighting source unit 10, according to a preferred embodiment of the present invention.
Figure 2:
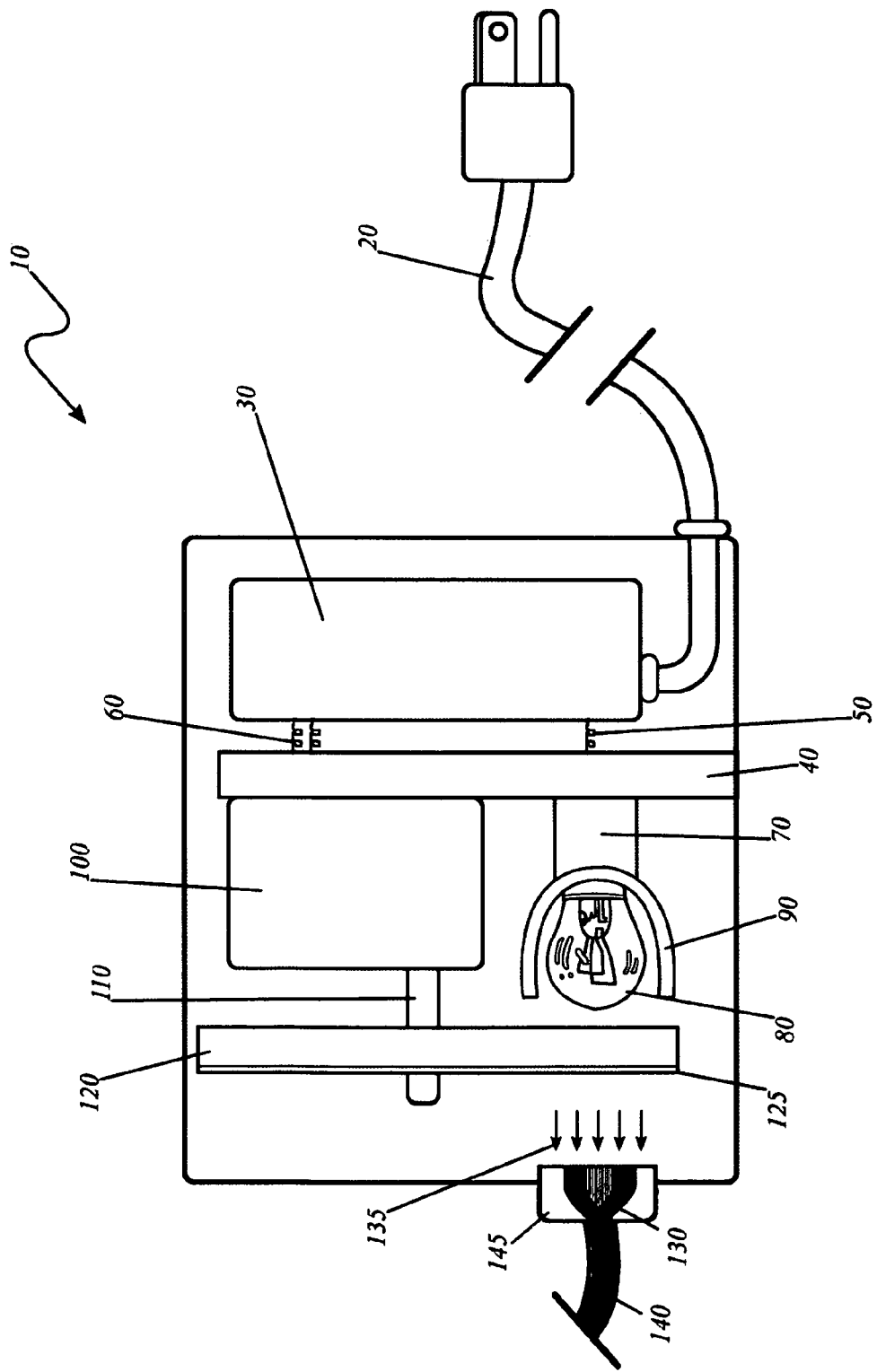
Figure 3:
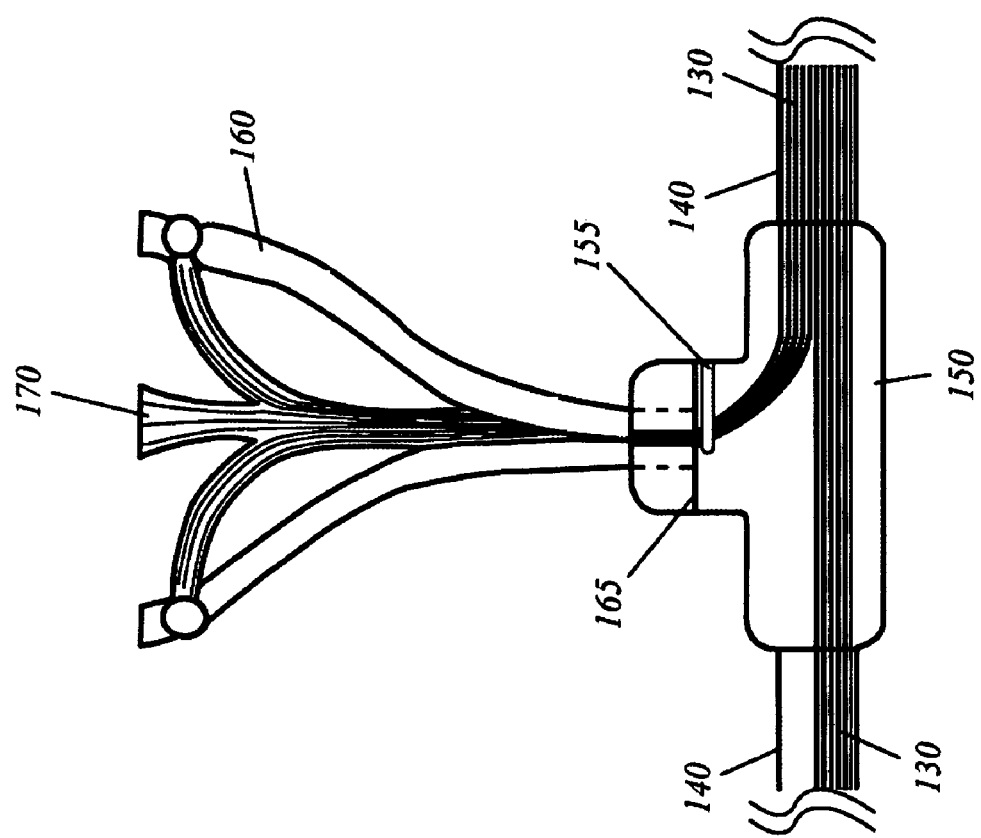
FIG. 3 is a close-up transparent view of a non-terminal "T" connector 150 and its connectivity with a decorative optical fiber insert 160; and, FIG. 4 is a close-up cut-away view of a fiber optic lighting source unit 10, depicting the color wheel 120 and color filter 125 portions, according to a preferred embodiment of the present invention.

The best mode for carrying out the invention is presented in terms of its preferred embodiment, herein depicted within FIGS. 1 through 3, respectively. However the invention is not limited to the described embodiment, and a person skilled in the art will appreciate that many other embodiments of the invention are possible without deviating from the basic concept of the invention. Any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIGS. 1 and 2, various views of a system for illuminating the aquarium are disclosed in accordance with the preferred embodiment of the present invention, generally comprising a fiber optic lighting source unit 10 and an aquarium 190.

FIG. 1 illustrates the illumination of aquarium 190 according to the preferred embodiment of the present invention. Optical fiber decorative inserts 160 having decorative insert optical fibers 170 are placed in the aquarium 190 to serve the dual purpose of decoration and illumination. The optical fiber decorative inserts 160 are connected through the optical fiber "T" connector 150. All the optical fibers are routed to the aquarium 190 from the fiber optic lighting source unit 10 in the form of a bundle 130 protected by an optical fiber sheath 140.

The fiber optic lighting source unit 10, as illustrated in FIG. 2 comprises a power supply 30 supplying power to a lamp 80 and an electric motor 100. The power supply 30 is power from an external supply using a power cord 20. The motor 100 and the lamp 80 are clamped over a motor 100 and lighting mount 40 and powered using wire 60 and 50, respectively. Depending upon the type of lighting, the unit 10 may be provided with a lamp socket 70 and lamp shroud 90. Further, the motor 100 is provided with a wheel driver 110 and rotary wheel 120. The rotary wheel 120 has a color filter 125 placed such that when the device is functional, the motor 100 rotates the wheel driver 110 and hence the color filter 125. The lamp 80 illuminates the optical figure bundle 130 through the color filter 125 thereby creating a colored light 135. A fiber optical cable bundle 130 within a sheath 140 is provided which has a terminus 145 that is removably inserted into a port of the unit 10. The terminus 145 is open ended, thereby providing access for the colored light 135 to enter a proximal end of the each strand of the fiber optic bundle 130, for subsequent travel down the fiber optic cables.

FIG. 3 depicts a close-up transparent view of a non-terminal "T" connector 150 and its connectivity with a decorative optical fiber insert 160. The T connector 150 is connected on both linear ends to the fiber optic bundle sheath 140 and allows the fiber optic bundle 130 to pass therethrough. The "T" end permits the passage of a small amount of fiber optical threads from the bundle 130 up to a stop 165. This small bundle of fiber optical threads are retained with a clip 155 to orient the distal ends of the threads perpendicular to the stop 165, which is manufactured out of a transparent plastic to permit the passage of the colored light impulse 135. A decorative optical fiber insert 160 is placed therein the "T" end of the "T" connector 150 until it abuts the stop 165. The interior decorative insert optical fiber bundle 170 proximal ends are then immediately across the stop 165 from the distal ends of the small bundle of optical threads, thereby receiving the colored light impulse 135 and transmitting it through the decorative optical fiber insert 160.

Figure 4:
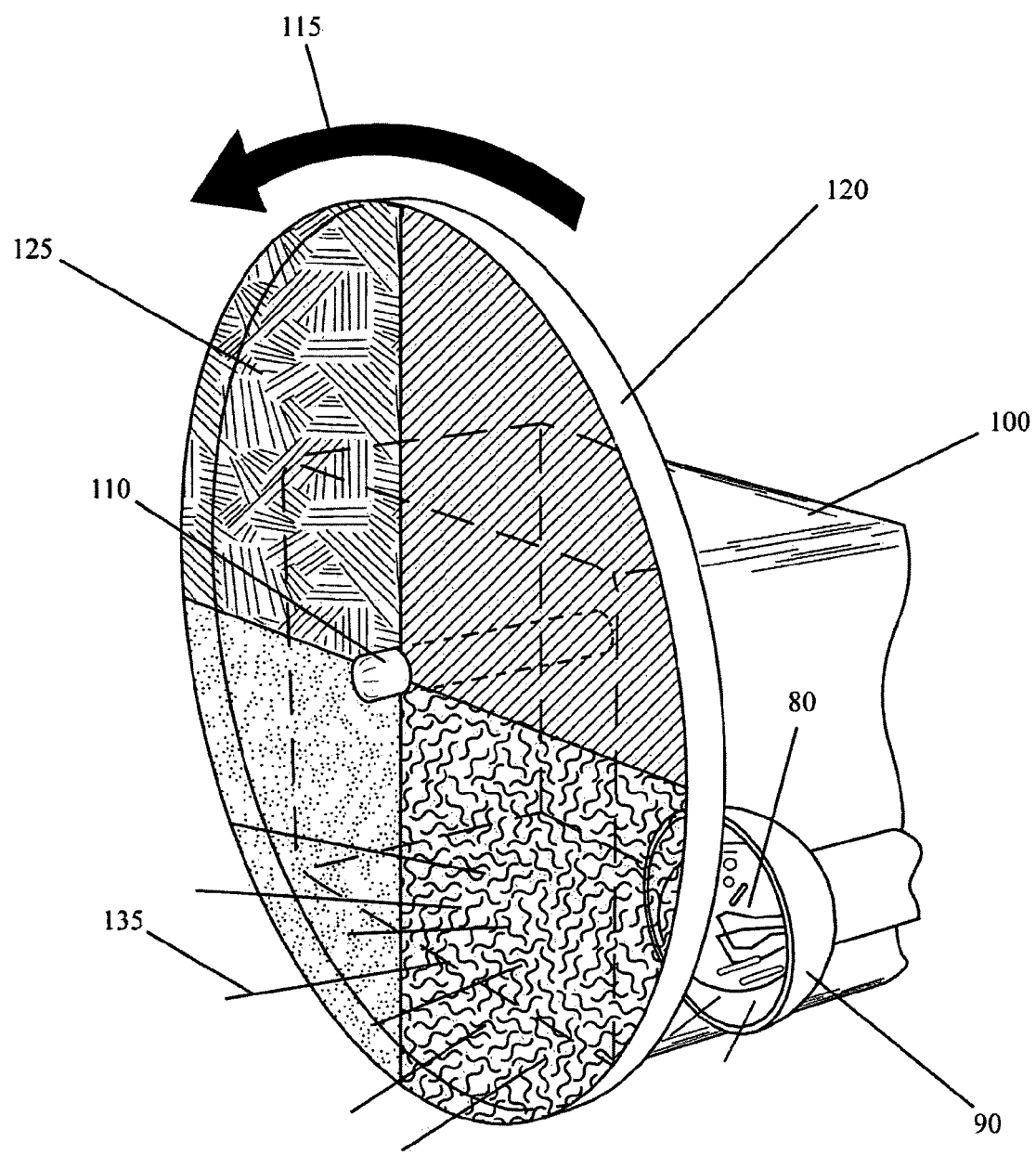

FIG. 4 is a close-up cut-away view of a fiber optic lighting source unit 10, depicting the color wheel 120 and color filter 125 portions, according to a preferred embodiment of the present invention. Herein depicted is an angled view of the color filter 125 as it is attached to the color wheel 120 driven by a wheel driver 110 of a motor 100. An angle of rotation 115 depicts the motion that the motor 100 and wheel driver 110 imparts on the color wheel 120 and color filter 110, thereby providing a means for altering color of illuminated light. Such a means is produced when the light source 80 illuminates the color filter 125 as it rotates and produces a colored light 135, which is subsequently transmitted to the optical fiber bundle 130. The color filter 125 may be a single color or a sectionalized amount of differing colors (herein depicted as four (4) distinct colors), thereby providing said means for altering color of illuminating light.

The preferred embodiment of the present invention is designed to be used by the common consumer with little or no special skills or prior experience or training necessary. The implementation of the preferred embodiment is a highly simple procedure. The distal end of the fiber optic bundle 130 with a plurality of optical fiber "T" connectors 150 are placed within a conventional aquarium, terrarium, or other similar device. The artificial aquarium decorative fixtures, fitted with/containing optical fiber inserts 160, are then installed within each "T" connector 150 and retained therein. This action aligns the decorative insert optical fiber bundle 170 with the distal ends of certain optical fiber threads of the bundle 130, which are retained therein via a clip 155. In the fixtures, the optical fiber inserts 160 may bifurcate into narrower tapering units, which supply the peripheral extremities 170 of the fixtures. The tapering units are collectively linked by a median trunk fiber at the base of which the fiber inserts coalesce and enter the optical fiber "T" connector 150. The "T" connectors are interlinked via an optical fiber bundle 130 encapsulated by a sheath 140, which leads from the unit 10. The terminus end 145 of the optical fiber bundle 130 is inserted into a port of the unit 10, with the proximal ends of the individual threads of the fiber optic bundle 130 being open-ended to receive a light from a light source. The device 10 is powered by means of the power supply cord 20. Alternately, the unit 10 is powered via on-board batteries. Once connected, the lighting source unit 10 provides the electric impulse, which activates the device 10 and, hence, the lamp 80 and the motor 100 located within the device. The colored light 135 is transmitted to the optical fiber bundle 130 after being subjected to passage through a color filter 125 connected to the rotary wheel 120 that is driven by the motor 100. The colored light impulse 135 is subsequently transmitted from the unit 10 through "T" connectors 150, which supply the decorative fixtures 160 containing the optical fiber inserts 170 and, subsequently, transmits the colored light 135 emanating from the optical fiber bundle 130, thus producing the illumination effect within the aquarium 190.

Thus, the present invention provides a changing colorscape inside of the aquarium 190, which can serve as the sole source of tank illumination if so desired. The use of this invention will provide a new appearance for aquariums 190 in a manner, which is not only quick, easy and effective, but aesthetically attractive and unique as well.

The foregoing descriptions of specific embodiments of the present invention have been presented for purposes of illustration and description. They are not intended to be exhaustive or to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and its various embodiments with numerous modifications as are suited to the particular use contemplated.

What is claimed is:

1. A method for illuminating decorative fixtures and lighting within an aquarium, comprising the steps of:
   providing artificial aquarium decorative fixtures fitted with or containing optical fiber inserts;
   providing a powered light source assembly;
   providing a fiber optic bundle within a protective sheath with a plurality of "T"-shaped connectors;
   inserting said fiber optic bundle into a port of said powered light source assembly;
   connecting said decorative fixtures with said optical fiber inserts to said "T"-shaped connectors;
   filling and stocking said aquarium;
   interchanging said decorative fixtures with new decorative fixtures to said "T"-shaped connectors, whether filled with water or empty;
   providing power to a high-intensity light source within said powered light source assembly;
   transmitting a light impulse from said high-intensity light source through said fiber optic bundle;
   transmitting said light impulse through said fiber optic bundle to said optical fiber inserts of said decorative fixtures.

2. The method of claim 1, further comprising the steps of:
   installing a color wheel rotatably mounted to a motor within said powered light source assembly between said high-intensity light source and said fiber optic bundle installed within said port of said light source assembly;
   providing power to said motor, said motor rotating said color wheel, said color wheel providing a colored light impulse;
   transmitting said colored light impulse from said high-intensity light source through said fiber optic bundle;
   transmitting said colored light impulse through said fiber optic bundle to said optical fiber inserts of said decorative fixtures.

3. A novel aquarium system with illuminating decorative fixtures, comprising:
   a plurality of artificial decorative fixtures fitted with or containing optical fiber inserts within a hollow cavity;
   a light source assembly illuminating said optical fiber inserts thereby illuminating artificial decorative fixtures and aquarium;
   a fiber optic bundle comprising a plurality of fiber optic threads within a protective sheath for transmitting a light impulse from said light source to said plurality of artificial decorative fixtures via at least one "T"-shaped connector; and,
   a means for altering color of illuminated light.

4. The system of claim 3, wherein said light source assembly further comprises:
   a protective cover;
   a power source with power supplied with an electrical power cord;
   a high-intensity light source, wherein said high-intensity light source is electrically connected to said power source to create a light impulse, said light impulse travels through said fiber optic bundle;
   a light socket for mounting said high-intensity light source within said light source assembly; and,
   a port for receiving said protective sheath of said fiber optic bundle.

5. The system of claim 4, further comprising:
   a motor electrically connected to said power source;
   a drive member connected to said motor at a proximal end and driven by said motor;
   a color wheel of at least one color connected to a distal end of said drive member, wherein said color wheel is placed between said high-intensity light source and said port, the placement of such produces a colored light impulse when said high-intensity light source is supplied with power, said colored light impulse travels through said fiber optic bundle.

6. The system of claim 5, wherein said color wheel is removable and interchangeable with other color wheels having at least one color.

7. The fiber optic bundle of claim 3, further comprising a plurality of fiber optic threads with a proximal end for receiving said light impulse from said high-intensity light source and transmitting said light impulse to a distal end.

8. The system of claim 3, wherein the "T"-shaped connector further comprising:
   a transparent stop located in an intermediary position within a perpendicular appendage of said "T"-shaped connector;
   means to removably connect said artificial decorative fixtures;
   a retaining clip to retain distal ends of a small bundle of fiber optic threads, said retaining clip orients said distal ends of said small bundle of fiber optic threads to perpendicularly abut against said stop; and,
   means to allow the remainder of the fiber optic bundle to pass therethrough a linear portion of said "T"-shaped connector through said protective sheath.

9. The "T"-shaped connector of claim 3, further comprising an end cap for a terminating "T"-shaped connector.

10. The system of claim 3, wherein the plurality of artificial decorative fixtures further comprises a plurality of objects and sizes.

11. The system of claim 10, wherein the plurality of objects and sizes comprise a decorative motif.

12. The system of claim 3, wherein said protective sheath is waterproof, flexible, electrically insulated, and large enough to accommodate a sufficient amount of individual fiber optic threads defining said fiber optic bundle.

13. The system of claim 11, wherein the plurality of artificial decorative fixtures further comprise transparent, translucent, waterproof, and colored properties either individually or a combination thereof.

* * * * *